3,730,749
PROCESS FOR PREPARING SILICA PIGMENT
James E. Morgan, Barberton, Ohio, assignor to PPG Industries, Inc., Pittsburgh, Pa.
No Drawing. Filed Mar. 10, 1971, Ser. No. 123,073
Int. Cl. C09c 1/28
U.S. Cl. 106—288 B        8 Claims

ABSTRACT OF THE DISCLOSURE

The substantial viscosity increase which occurs during the acidification or neutralization of aqueous alkali metal silicate is substantially minimized by adding a controlled amount of an alkali metal silicate.

---

This invention relates to an improved process for preparing silica for use in reinforcing rubber compositions and opacifying paper by the acidification of alkali metal silicate.

In the acidification of aqueous alkali metal silicate to precipitate pigmentary silica, there is a substantial increase in viscosity which occurs after the alkali metal silicate is partly neutralized. When sodium silicate is the alkali metal silicate and carbon dioxide the acidification agent, this increase in viscosity rises to a maximum when the sodium silicate is neutralized between about 25 percent and about 60 percent (theoretical, assuming no loss of $CO_2$) of stoichiometry for the formation of sodium carbonate. This viscosity increase is dependent upon the rate of addition of acidifying agent, temperature of reaction, concentration of reactants, and degree of agitation and thus a more precise definition of when it occurs is not possible although it is easily determined for any conditions by simple experiment. It is believed that this viscosity increase contributes to the formation of aggregates and to a precipitated silica having a wide range of particle sizes some of which are unsuitable for rubber or paper reinforcement. In addition, it is believed that this substantial viscosity increase causes a substantial amount of soluble sodium silicate to prematurely precipitate and, thus, causes some acidification to occur on solid state sodium silicate rather than in solution at an anticipated molar concentration. Further, the resultant viscous solution makes handling of the alkali metal silicate slurry more difficult and requires either increased agitation and/or a varied addition rate of acidification agent.

This increase in viscosity is illustrated graphically by U.S. Pat. No. 3,235,331, issued Feb. 15, 1966, and occurs whether the acidification is conducted by simultaneously introducing acidifying agent and aqueous alkali metal silicate or the acidifying agent added to a pool of alkali metal silicate such as in a batch process. It is stated in the aforesaid mentioned patent that after the maximum increase in viscosity is achieved, the viscosity falls rapidly particularly if the alkali metal silicate addition is discontinued and further acid is added.

It has now been discovered that the viscosity can be controlled such that no substantial increase occurs so that the aforesaid disadvantages are eliminated and the process more easily controlled. Quite surprisingly, this decrease in viscosity is achieved by adding additional aqueous alkali metal silicate. The alkali metal silicate is added whether the process is conducted by simultaneously adding acidifying agent and alkali metal silicate or the process conducted in a batch operation wherein a pool of alkali metal silicate is acidified. More particularly, the alkali metal silicate is added in an amount and at a rate sufficient that the viscosity of the pool does not exceed about 500 centipoises but preferably not more than about 200 centipoises. The viscosity was measured by a Brookfield viscometer employing a No. 2 spindle at 50 r.p.m. with the pool at 56° C. When no additional silicate is added such as in a batch process, the viscosity is greater than 800 and, in fact, exceeds the scale for the aforesaid mentioned apparatus. The amount of alkali metal silicate added will depend on its concentration, the concentration of the alkali metal silicate pool, the reaction conditions and the fluidity desired, but quite surprisingly the viscosity of the pool never reaches anywhere near as high a viscosity when this added silicate is neutralized as is the case when no alkali metal silicate is added or the amount added is insufficient. Although the amount of alkali metal silicate added will depend upon the aforementioned variables, generally from between about 10 percent and about 200 percent by weight of the alkali metal silicate in the pool will be sufficient. The alkali metal silicate added will generally contain at least about 50 grams per liter $SiO_2$ and preferably 200 grams per liter $SiO_2$ or more. The upper limit is dependent only upon the particle size of pigment desired and the fluidity desired. Higher concentrations, however, favor higher percentages of filter cake resulting in more product per unit of reactor and reaction time. The alkali metal silicate addition for a batch process is preferably more concentrated than the original alkali metal silicate. For example, in commercial practice the most preferred sodium silicate solution for the start of the neutralization contains about 100 grams per liter $SiO_2$ whereas the alkali metal silicate addition can be made with material having about 230 grams per liter $SiO_2$ or commercial alkali metal silicate of 410 grams per liter $SiO_2$ or even greater amounts can be employed. Materials in the preferred ranges are quite fluid and production capacity is greater per unit of reactor capacity.

The aqueous alkali metal silicate addition can be added as rapidly as the equipment will permit without a significant increase in viscosity. In a batch process, the entire addition is preferably made between the time the viscosity of the pool is between about 50 and about 400 and more preferably between about 50 and about 200 centipoises. When a continuous process is employed, the alkali metal silicate addition should be made at a rate which exceeds the acid rate which will be at least about 6 or 8 times the acid rate when the viscosity increase occurs. After the silica begins to precipitate, however, and substantial carbonation of the pool has occurred, the alkaline metal silicate addition can be reduced or terminated without any further significant increase in viscosity.

While the mechanism of the invention is not understood, it is believed that when the addition of a suitable amount of alkali metal silicate is made to the partially acidified alkali metal silicate solution before the partially acidified pool undergoes its maximum viscosity, that the polymerization of sodium silicate is inhibted. In any event, it has been found that the alkali metal silicate addition results in a more fluid solution permitting a more rapid and more efficient acidification rate. Moreover, it is not necessary to decrease the acidification rate as has normally been required in commercial processes when the viscosity reached its maximum. Thus, by the process of the invention, it is possible to obtain a more concentrated product in approximately the same or less time under easily controlled conditions.

The acidification can be conducted over a relatively short period such as between about one-quarter and about 5 hours and generally between about 1 and about 3 hours will be sufficient. More complete and rapid reaction can be obtained by agitating the mixture at a speed sufficient to disperse or sub-divide the carbon dioxide bubbles when carbon dioxide is employed as the acidifying agent and obtain efficient adsorption. Inasmuch as the solution or slurry is more fluid by the process of the invention, the acidification rate and agitation can both be more rapid than heretofore.

Conventional reaction coditions can be employed such as, for example, a temperature of between about 0° C. and about 90° C. at atmospheric pressure, or up to 120° C. or more under increased pressure.

The silica product can be dried at a temperature between about 100° C. and 300° C. employing conventional equipment.

The sodium silicate used normally should have the composition $Na_2O(SiO_2)_x$, where $x$ is 2 or above, usually 2 to 4 including the fractional numbers preferably in the range of from 3 to 4. Other alkali metal silicates, such as potassium and lithium, rubidium, cesium, can be employed if desired but the sodium silicate is readily available and preferred. The preferred acidifying agent is carbon dioxide, although other acidic materials which are water-soluble can be employed, such as, for example, sodium bicarbonate, hydrochloric acid, sulfuric acid, phosphoric acid, sulfurous acid, nitric acid, and acetic acid, ammonium bicarbonate, sodium acid sulfate, disodium acid phosphate, sulfur dioxide, hydrogen chloride, hydrogen sulfide, chlorine and the like, or any other acidic material which reacts with the alkali metal silicate to neutralize the alkali thereof can be used. Generally, the total amount of acidifying agent should be sufficient to precipitate substantially all or at least a major portion of the silica in the solution and preferably should be enough to largely neutralize the $Na_2O$ content of the silicate to produce precipitated silica containing less than 2 percent and more preferably less than 1 percent $Na_2O$. Such addition normally reduces the pH of the slurry below about 9.5.

The surface area of the silica pigment can be stabilized within the desired range from a higher value by heating the silica at a pH above 5, preferably 7 to 9, in aqueous medium for a suitable period, usually in excess of 30 minutes. For a more complete description as to the precipitation of silica including the reaction conditions and stabilization of pigment, reference should be made to Thornhill, U.S. Pat. 2,940,830, issued June 14, 1960, and particularly columns 3, 4, 9, 10, 11 and 12, which reference is herein incorporated by reference in its entirety.

The silica pigment will generally have a predominant ultimate (smallest) particle size between about 100 and 500 angstroms and a surface area of between about 40 and about 1,000 square meters per gram (B.E.T.), preferably between about 100 and about 500 when the pigment is employed in a rubber formulation. The surface area can be obtained by degassing the silica previously dried at 105° C. in vacuum to remove residual or entrapped gas therein and then measuring the amount of nitrogen which is adsorbed by the silica under controlled temperature and pressure. The surface area is computed from this amount. This Brunauer-Emmett-Teller method is described in The Journal of the American Chemical Society, vol. 60, p. 309, et sq., February 1938.

The following examples will serve to illustrate the invention and its preferred embodiments. All parts and percentages in said examples are by weight.

EXAMPLE I

A sodium silicate solution of 30 grams per liter $Na_2O$ was made by diluting 2,826 grams of sodium silicate (6.37 percent $Na_2O$, 19.96 percent $SiO_2$), to 6 liters with distilled water. This solution was heated in a 12 liter nickel reactor to a temperature of 56° C. by a steam coil and carbon dioxide was introduced into the solution at a rate of 0.0133 mole per minute for 273 minutes and the final pH of the solution was 9.8. The mixture was, during this time, thoroughly agitated by means of a single baffle approximately 1½ x 10 inches and a 4 x ⅝ inch rectangular blade agitator powered by an air motor. The carbon dioxide was bubbled into the reactor at a position under the agitator through a razor slit in a piece of rubber tubing. During the carbon dioxide addition, it was noted that the solution became very turbid after 92 minutes and started to precipitate at 100 minutes when sufficient carbon dioxide had been added to carbonate 45.8 percent of the sodium silicate in a solution and at 112 minutes there was a substantial increase in viscosity and there was no surface motion to the thick slurry. Agitation was then increased slightly. At 90 minutes, the pH was 11.1, at 185 minutes 10.6, at 200 minutes 10.4, at 240 minutes 10.0 and 9.8 at 273 minutes. At 165 minutes, 350 milliliters of water was added to restore evaporated water and the volume to the original volume.

The solution was then boiled for 1 hour and filtered by employing two 32 centimeter Buchner funnels, washed three times with a volume of water equal to the volume of the cake, re-slurried and acidified to a pH of 3 with 6 normal hydrochloric acid, filtered, water-washed five times and after extended vacuum on the filters of about 45 minutes, the filter cake having a solids content of 18½ percent solids was dried at 105° C. in a forced draft oven. The ultimate particle size was 200 angstroms and the surface area 150 m.$^2$g. (B.E.T.).

EXAMPLE II

In accordance with the procedure of Example I, a silica was prepared with the exception that after 98 minutes of carbonation 60 percent by weight more sodium silicate (1,695 grams) was rapidly poured into the turbid solution (the addition required less than 10 seconds). Within 2 minutes, the solution became clear. The pH of the solution was 11.05 after 90 minutes and 11.2 after 105 minutes of carbonation. The sodium silicate addition was made when sufficient carbon dioxide had been added to carbonate or neutralize 44.8 percent of the sodium silicate. After 130 minutes of carbonation, the solution was turbid, after 138 minutes very turbid and by 140 minutes when sufficient carbon dioxide had been added to carbonate 40 percent of the sodium silicate, fine grains of precipitate started. After 146 minutes, there was good surface motion except for the outer area so that agitation was increased sufficiently to obtain intimate mixture. The solution pH was 11.05 at 186 minutes (53.2 percent carbonation), 10.75 at 270 minutes (77.3 percent carbonation), 10.5 at 320 minutes (91.5 percent carbonation), 10.1 at 372 minutes (106.4 percent carbonation), and 9.8 at 422 minutes. The solution was washed and filtered as before and the filter cake contained 24.9 percent solids after the extended vacuum on the filters of about 45 minutes. After drying, the cake consisted of 832 grams of friable lumps which were easily crushed and slightly dusty. The particle size range was 150–450 angstroms, ultimate particle size 290 angstroms and surface area 295 m.$^2$/g. (B.E.T.).

EXAMPLE III

The procedure of Example I was repeated with the exception that after 107 minutes of carbonation, 60 percent more sodium silicate was added to the pool, which had started to precipitate silica at 100 minutes. The addition was made in less than 10 seconds. By 120 minutes, it appeared that much of the precipitate had dissolved but after 140 minutes of carbonation precipitation was occurring again. At 275 minutes or when sufficient carbon dioxide had been added to neutralize 79 percent of the sodium silicate, the carbon dioxide rate was doubled to 0.4266 mole per minute in the very fluid slurry and continued at this rate until 320 minutes had elapsed when the slurry had a pH of 9.8. The pH after 124 minutes was 11.0 and after 200 minutes 10.85. The precipitate was filtered, washed three times with water, filtered, reslurried in water, and acidified with 1.04 moles of hydrochloric acid to adjust the pH down to 3 to remove the 1 to 2 percent sodium oxide in the filter cake, and then washed five times with water. The wet cake contained 25.1 percent solids after extended vacuum on the filters (about 45 minutes) and the cake after drying contained 848 grams of friable lumps which were easily crushed and a little dusty. The particle size range was 200–550 angstroms, ultimate particle size 310 angstroms, and surface area 310 m.²/g. (B.E.T.).

From the viscosity readings reported in the following Table 1 for Examples I, II, and III, it can be seen that when additional alkali metal siliacte is added that the viscosity of the solution does not become as great as when none is added so that in approximately the same acidification time a filter cake of increased solids content can be recovered. Further, because the solution does not become so viscous, more intimate mixing can be optained and carbonation conducted at a faster rate without danger of the acidification agent such as carbon dioxide escaping into the atmosphere when the reaction is conducted in an open container. In addition, agitation is more easily accomplished in the less viscous solutions. The data show that best results are obtained when the sodium silicate addition is made after the viscosity of the solution has begun to increase above about 50 but before it is more than about 200 since the viscosity of the solution never again becomes great during the acidification. From the data reported for Example III, it can be seen that the viscosity did not exceed 256.

TABLE 1

Brookfield Viscosity Measurements, #2 Spindle (50 r.p.m.), 56° C (centipoise)

| $CO_2$ time (min.) | Percent $CO_2$ added | Example I — No additional sodium silicate | Example II — 60% sodium silicate added before increase in viscosity | Example III — 60% sodium silicate added after increase in viscosity |
|---|---|---|---|---|
| 85 | 38.9 | 8 | | |
| 95 | 43.4 | 18 | | |
| 96 | 39.3 | | 8 | |
| 101 | 46.2 | 64 | | |
| 103 | 46.5 | | | 160 |
| 107 | 48.9 | 136 | | |
| 110 | 31.4 | | | 24 |
| 114 | 52.4 | 392 | | |
| 116 | 33.1 | | | 4 |
| 126 | 35.9 | | | |
| 126 | 57.9 | >800 | | |
| 130 | 37.0 | | 4 | |
| 140 | 40.0 | | | 88 |
| 143 | 65.6 | (¹) | | |
| 146 | 41.8 | | 014 | |
| 150 | 43.1 | | | 192 |
| 156 | 44.6 | | 344 | |
| 166 | 47.4 | | 488 | |
| 170 | 48.7 | | | 256 |
| 171 ² | 78.2 | | | |
| 180 | 51.5 | | | 224 |
| 186 | 53.2 | | 440 | |
| 200 | 91.7 | | | |
| 200 | 57.9 | | | 195 |
| 216 | 61.8 | | 520 | |
| 240 | 110.0 | | | |
| 240 | 68.7 | | 440 | |
| 250 | 71.5 | | | 168 |
| 270 | 77.3 | | 448 | |
| 273 | 125.1 | | | |
| 275 | 78.6 | | | 160 |
| 310 ³ | 98.9 | | | 88 |
| 333 | 95.2 | | 432 | |
| 372 | 106.6 | | 400 | |
| 372 ⁴ | 106.6 | | 208 | |
| 422 ⁴ | 120.9 | | 208 | |

¹ Off scale.
² After 350 ml. of $H_2O$ added to return to original volume.
³ After 250 ml. of $H_2O$ added to return to original volume.
⁴ After 500 ml. of $H_2O$ added to return to original volume.

EXAMPLE IV

The siliceous pigments of Examples II and III and a commercial pigment Hi-Sil 233 (a product of PPG Industries, Inc.) were incorporated into rubber formulations and subjected to various conventional tests. The first three ingredients shown in Table 2 were mixed in a Banbury for about 5 minutes at a temperature between about 300° F. and 320° F. and then the rubber batch was further mixed on an open rubber mill and the last five ingredients shown in Table 2 were added. The mixing on the mill was continued for about 10 minutes at about 180° F.

Table 2

| Ingredients: | Parts by weight |
|---|---|
| Styrene butadiene rubber SBR–1502 | 100 |
| Siliceous pigment | 60 |
| Phenyl beta naphthylamine | 1.0 |
| Zinc oxide | 4.0 |
| Sulfur | 2.5 |
| Diortho tolylguanidine | 1.5 |
| Benzothiazyl disulfide | 0.75 |
| Tetramethyl thiuram disulfide | 0.25 |

The physical tests and the results are reported in the following Table 3:

TABLE 3.—RUBBER DATA

| | IV-A of Example No. 2 | IV-B of Example No. 3 | IV-C, Hi-Sil 233 |
|---|---|---|---|
| Siliceous pigment: | | | |
| Particle size range, A | 150–450 | 200–550 | 140–270 |
| Ultimate particle size average, A | 290 | 310 | 210 |
| Surface area (B.E.T.), m.²/g | 295 | 364 | 150 |
| 95% cure at 300° F., min | 12.5 | 12.5 | 23.0 |
| Scorch time, min | 6.5 | 6.0 | 10.0 |
| Tensile strength, p.s.i | 2,190 | 2,480 | 2,860 |
| Modulus, 300% p.s.i | 1,580 | 1,600 | 1,090 |
| Elongation, percent | 410 | 470 | 510 |
| Shore A Hardness ¹ | 70 | 68 | 80 |
| Pico abrasion ² | 90 | 83 | 65 |

¹ Tested according to ASTM D-314.
² Tested according to ASTM D-2228-63 T.

From the table, it can be seen that the rubber compositions incorporating siliceous pigments prepared by the process of the invention have a desirable high moduli. Moreover, the low Shore Hardness and high Pico abrasion figures indicate that the vulcanized compositions are soft yet extremely abrasion-resistant. Such desirable properties particularly make the compositions of the invention useful for engine mounts, tire treads and carcasses, belting, and shoe soles.

While there are above described a number of specific embodiments of the present invention, it is obviously possible to produce other embodiments and various equivalent modifications thereof without departing from the spirit of the invention.

Having set forth the general nature and specific embodiments of the present invention, what is claimed is particularly pointed out in the appended claims:

1. In a process for preparing finely-divided silica pigment by the acidification of an aqueous alkali metal silicate pool to precipitate a finely-divided silica pigment, the improvement comprising adding alkali metal silicate to a partially acidified pool when the viscosity is between about 50 and about 500 in an amount and at a rate sufficient that the viscosity of the pool does not exceed about 500 centipoises.

2. The process of claim 1 wherein the alkali metal silicate is added in an amount and at a rate sufficient that the viscosity of the pool does not exceed about 200 centipoises.

3. The process of claim 1 wherein the additional alkali metal silicate is added when the pool is between about 25 and about 60 percent acidified.

4. The process of claim 1 wherein the quantity of the alkali metal silicate added is from between about 10 and about 200 percent by weight of the alkali metal silicate in the pool.

5. The process of claim 1 wherein the alkali metal silicate added contains from about 230 grams per liter $SiO_2$ to about 410 grams per liter $SiO_2$.

6. The process of claim 1 wherein carbon dioxide is employed to acidify the alkali metal silicate.

7. The process of claim 1 wherein the alkali metal silicate is sodium silicate.

8. The process of claim 1 wherein the additional alkali metal silicate is added when the pool is between about 25 and about 60 percent acidified and the quantity of the alkali metal silicate added is from between about 10 and about 200 percent by weight of the alkali metal silicate in the pool.

References Cited

UNITED STATES PATENTS 3,235,331  2/1966  Nauroth _____ 23—182 R

JAMES E. POER, Primary Examiner

U.S. Cl. X.R.

423—339